(12) United States Patent
Nelson

(10) Patent No.: US 6,428,176 B1
(45) Date of Patent: Aug. 6, 2002

(54) BACKLIT LIQUID CRYSTAL DISPLAY STRUCTURE FOR A LAPTOP COMPUTER

(75) Inventor: Richard Nelson, Butte, MT (US)

(73) Assignee: Gateway, Inc., North Sioux City, SD (US)

( * ) Notice: Subject to any disclaimer, the term of this patent is extended or adjusted under 35 U.S.C. 154(b) by 0 days.

(21) Appl. No.: 09/428,208

(22) Filed: Oct. 27, 1999

(51) Int. Cl.$^7$ .............................................. G02B 27/12
(52) U.S. Cl. ...................... 362/31; 362/318; 362/109; 362/85; 362/26; 362/561
(58) Field of Search .................... 362/31, 318, 109, 362/26, 561, 85; 385/146, 133, 31; 313/512; 345/176; 349/137, 138, 122

(56) References Cited

U.S. PATENT DOCUMENTS

| 5,098,179 A | 3/1992 | Turner .......................... 359/68 |
| 5,134,548 A | 7/1992 | Turner .......................... 362/29 |
| 5,202,950 A | * 4/1993 | Arego et al. .................. 362/32 |
| 5,363,227 A | 11/1994 | Ichikawa et al. ............. 359/83 |
| 5,467,215 A | 11/1995 | Lebby et al. ................ 359/247 |
| 5,486,942 A | 1/1996 | Ichikawa et al. .............. 359/83 |
| 5,539,554 A | 7/1996 | Lebby et al. .................. 359/83 |
| 5,543,958 A | 8/1996 | Lebby et al. ................ 359/254 |
| 5,703,664 A | 12/1997 | Jachimowicz et al. ........ 349/58 |
| 5,838,404 A | * 11/1998 | Ozeki et al. .................. 349/65 |
| 6,044,196 A | * 3/2000 | Winston et al. ............. 385/146 |
| 6,145,992 A | * 11/2000 | Wattengburg ................. 362/85 |
| 6,151,169 A | * 11/2000 | Kim ............................. 362/31 |
| 6,344,888 B2 | * 2/2002 | Yasukawa .................... 349/113 |

* cited by examiner

Primary Examiner—Sandra O'Shea
Assistant Examiner—Anabel Ton
(74) Attorney, Agent, or Firm—Laurence R. Letson

(57) ABSTRACT

A light pipe or illumination distributor of a backlit liquid crystal display panel in a hinge or tilt-up display for a laptop computer is coated with a highly reflective coating to control and eliminate the escape of light except through the front or exit face of the illumination distributor which is juxtaposed with the back side of a liquid crystal display panel. The highly reflective coating is further coated with a highly abrasion and shock resistant coating, such as an epoxy paint, to serve as the exterior of the computer display, thereby eliminating the need for a cover for the back of the display.

14 Claims, 4 Drawing Sheets

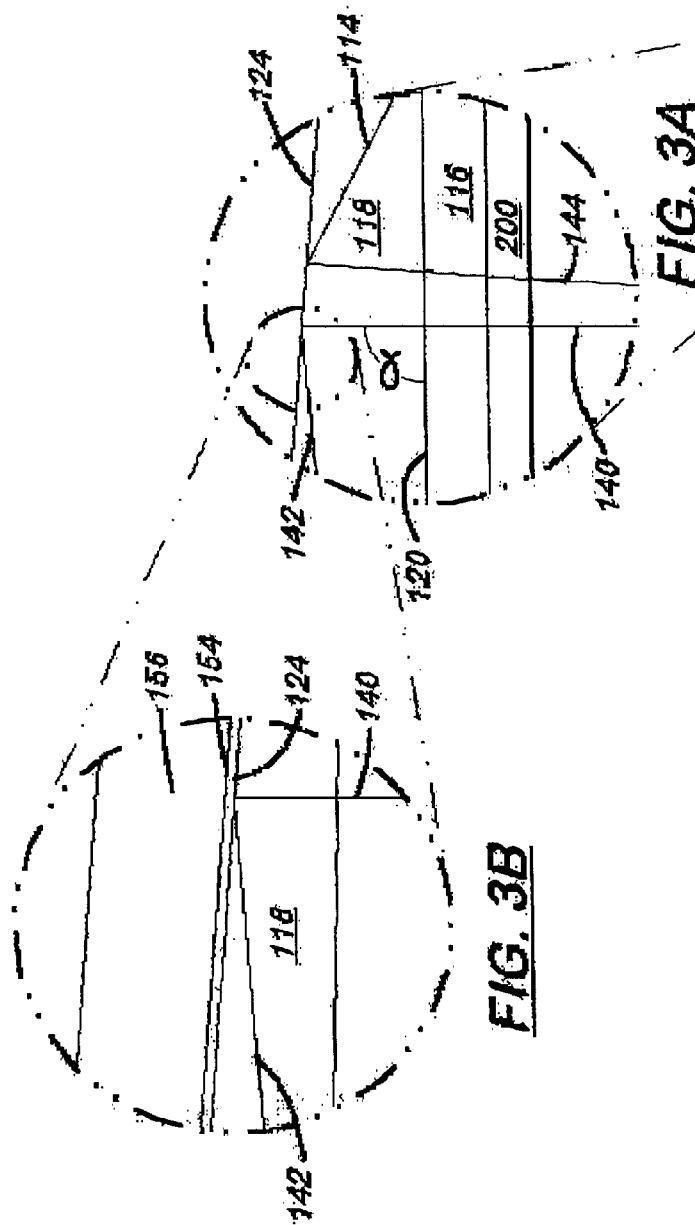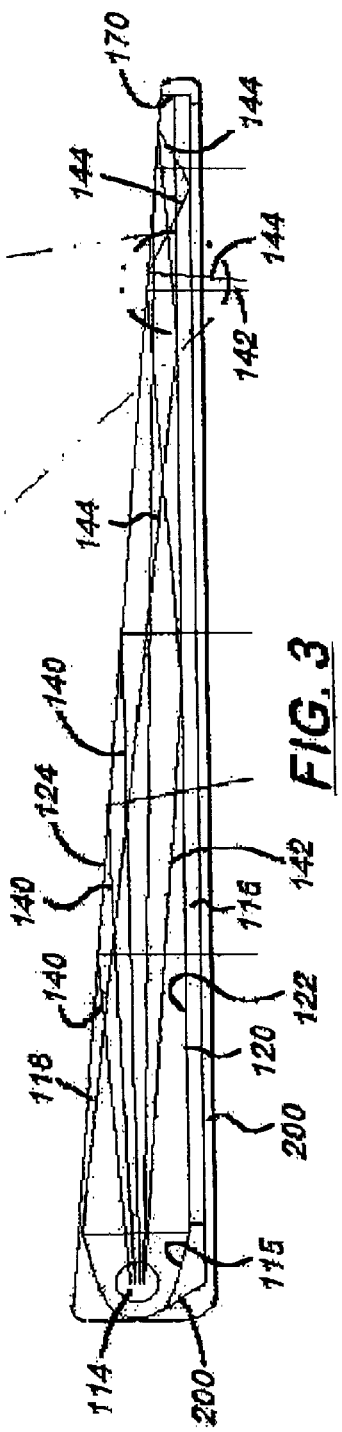

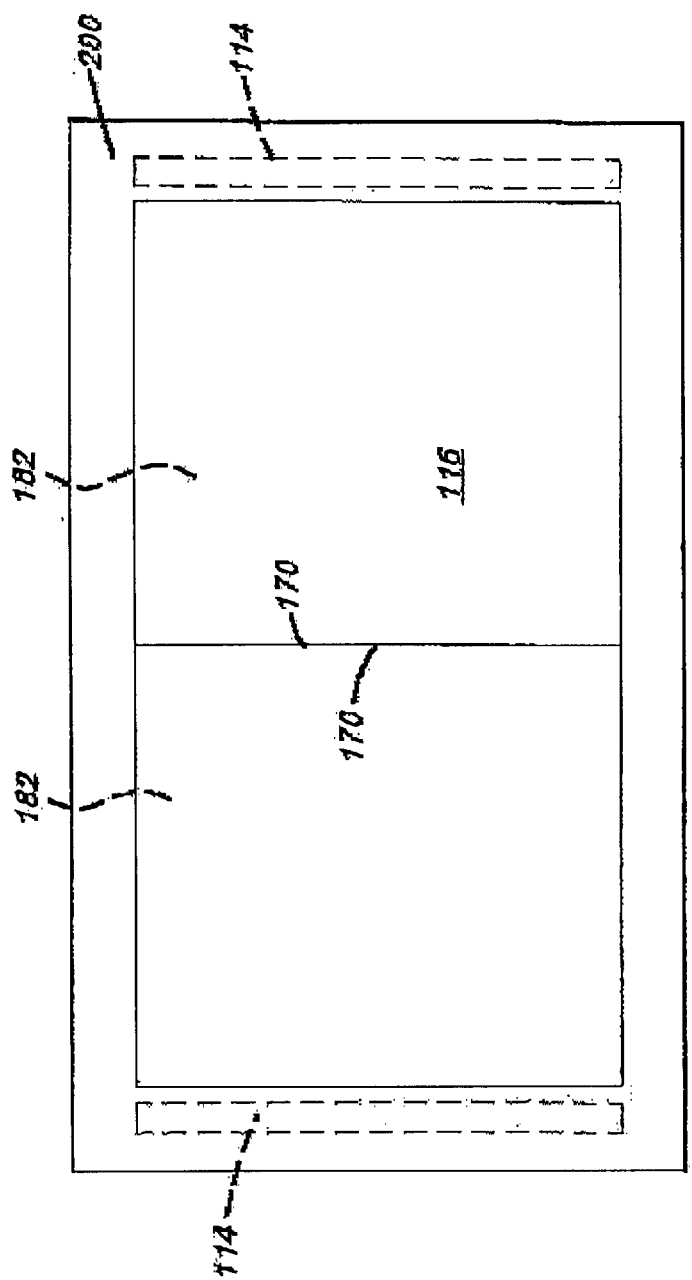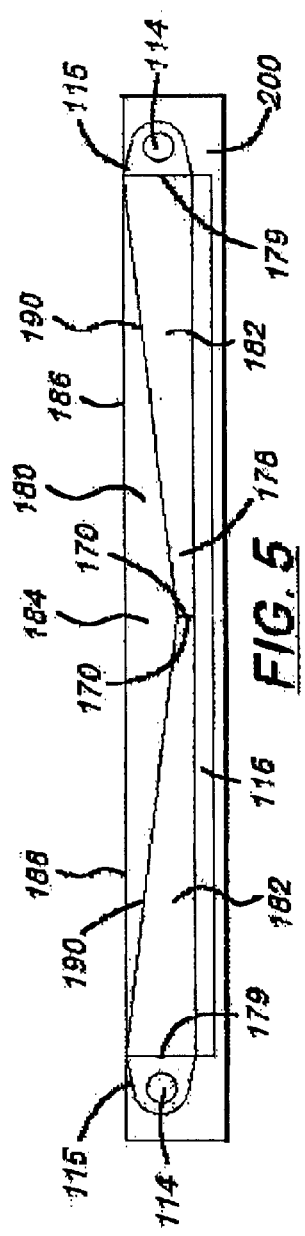

BACKLIT LIQUID CRYSTAL DISPLAY STRUCTURE FOR A LAPTOP COMPUTER

FIELD OF THE INVENTION

The invention relates to a hinged or tilt-up display for laptop computers and more specifically to a design of a display unit without an exterior housing shell over the exterior surface of the illumination distribution member. By eliminating this exterior housing shell, substantive reductions may be realized in the height and weight of the display unit and, therefore, in the height and weight of the laptop computer itself.

BACKGROUND OF THE INVENTION

Computer designers continually strive to reduce the weight and size of their laptop models without any loss of protection or function in the unit. In the effort to reduce weight, to eliminate at least a significant portion or all of the metal outer cover of the hinged or tilt-up display of a laptop computer is highly advantageous. Simply eliminating the cover could expose significant portions of the internal elements of the display to abuse and wear through normal handling; therefore, a means of protection of these internal elements must be addressed.

A liquid crystal display of a laptop computer in order to function efficiently in various lighting environments requires back lighting, i.e., light passed from the rear of the liquid crystal display panel through the liquid crystal display panel, then to the viewer's eye.

A frontlit liquid crystal display accepts light from the ambient surroundings and reflects the light off of a mirror-like surface behind the liquid crystal display panel and through the liquid crystal display panel to the viewer's eye. Backlit liquid crystal displays are far superior because the backlit liquid crystal display is not dependent upon ambient light levels and lighting angles and thus can be used in low light or dark environments unlike frontlit displays.

Illumination of a liquid crystal display panel requires both compact lighting and precise illumination control to prevent over intensity and/or under intensity of light which create hot and/or cold spots on the display panel. The terms "hot" and "cold" connote light density, not temperature.

The distribution of the light over the area of the liquid crystal display panel must be provided and controlled by a rigid member which, if bumped or impacted, will not be deformed and change the illumination distribution. The exterior of the display must be structurally capable to withstand wear and normal abrasion without affecting the optical quality necessary for light distribution to the liquid crystal display panel.

SUMMARY OF THE INVENTION

A backlit liquid crystal display associated with a hinged or tilt-up display of a laptop computer is constructed such that the rear or exposed surface of an illumination distributor is formed to reflect light from a light source to and through the front face of the illumination distributor, thereby passing the light through the liquid crystal display panel. The illumination distributor can be fabricated from an acrylic material such as LEXAN® plastic which is a good light transmitting material with well known internal reflective qualities.

The rear or primary reflecting surface of the illumination distributor is coated with a highly reflective coating to enhance the containment of light and prevent light loss. Subsequently, the reflective coating is coated with an additional tough protective layer or coating, such as an epoxy paint, forming the exposed exterior surface of the tilt-up display of the laptop computer.

A bezel may be fitted surrounding the edges of the illumination distributor and liquid crystal display panel assembly, thereby holding all elements in their respective places. Alternatively, the assembly may use an illumination distributor formed to accept the other elements of the display into a cavity, thus forming a housing for the display elements.

A more complete and thorough understanding of the invention and the display unit may be had from the attached drawings and the detailed description of the invention to follow.

BRIEF DESCRIPTION OF THE DRAWINGS

FIG. 3 illustrates a sectional view of the bezel and an end view of internal components of the hinge or tilt-up display of the invention.

FIG. 3A illustrates an enlargement of the stack of elements of the display assembly of FIG. 3.

FIG. 3B illustrates an enlargement of the rear surface of the illumination distributor of the display assembly shown in FIG. 3 and FIG. 3A.

FIG. 4 shows a display assembly having two illumination sources and a compound illumination distributor.

FIG. 5 illustrates a top sectional view of the bezel and a top-edge view of the internal components of the display assembly in FIG. 4.

DETAILED DESCRIPTION OF THE BEST MODE OF THE PREFERRED EMBODIMENT OF THE INVENTION AS CONTEMPLATED BY THE INVENTOR

Figure 1:
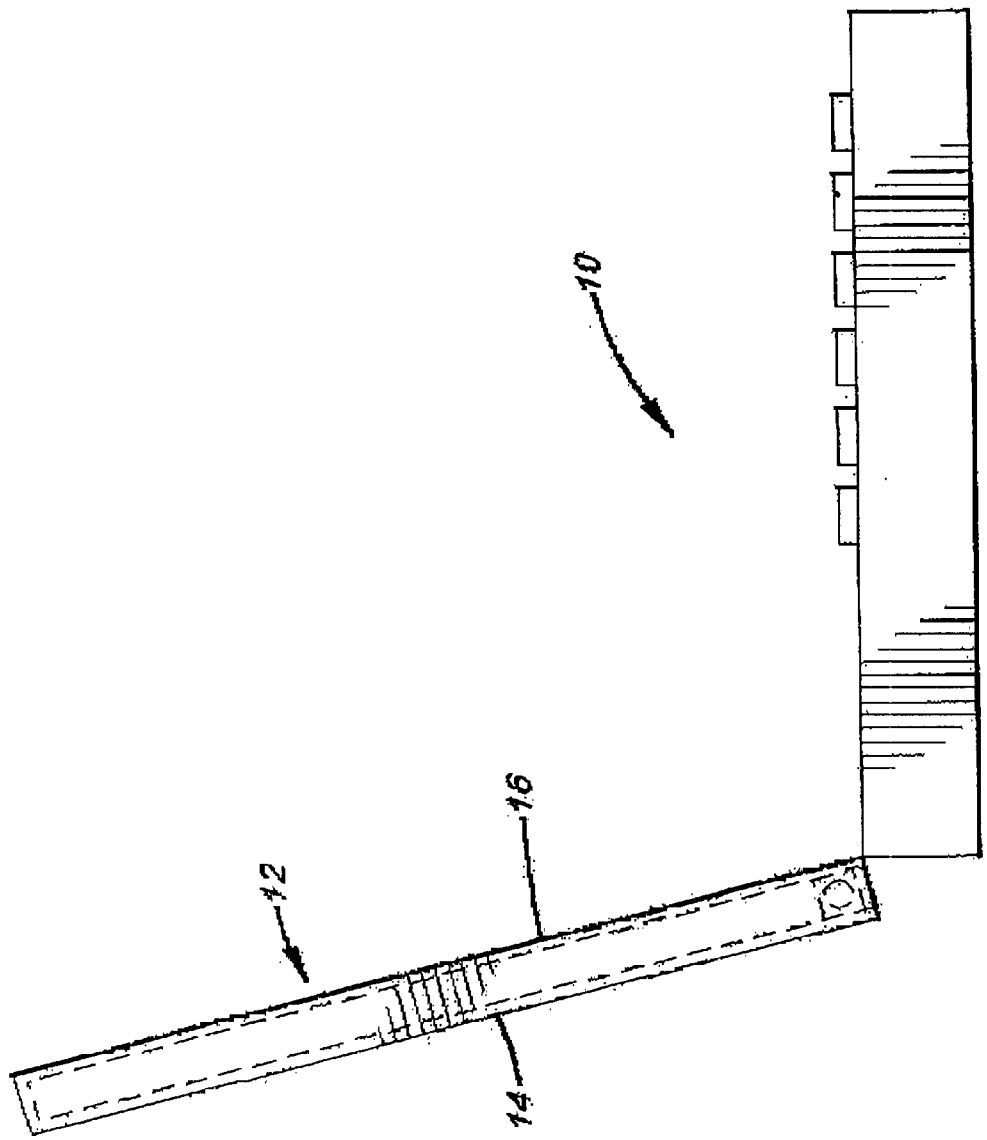
FIG. 1 illustrates a side view of a prior art laptop computer with a hinge or tilt-up display.

FIG. 1 shows a typical liquid crystal tilt-up display unit 12 of a prior art laptop computer 10. The display unit 12 contains a light distribution/light transmission apparatus which rear illuminates the liquid crystals display panel. The tilt-up display 12 includes a housing 14 to enclose the display and illumination elements of the entire assembly on at least five sides, the four edge sides, the backside, and partially on the front or face side of the liquid crystal display panel. The housing typically is fabricated of sheet metal, bent and formed to contain the various elements of the liquid crystal display.

Figure 2:
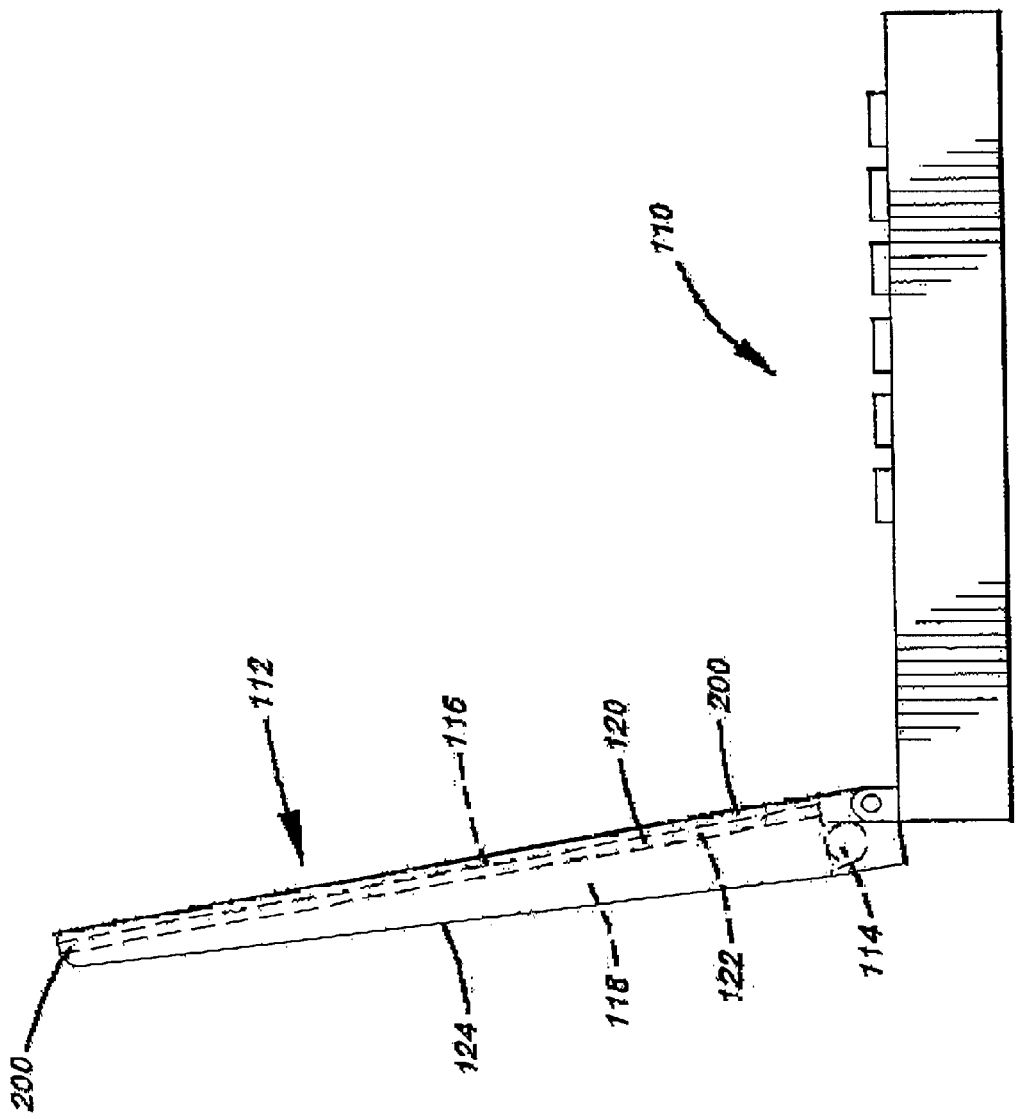
FIG. 2 illustrates an end view of a laptop computer with a hinge or tilt-up display of the invention.

Referring now to FIG. 2, the laptop computer 110 with a fold-up or tilt-up display 112 incorporating the invention is shown with the display 112 in its elevated position. Light source 114 is an elongated light bulb and is disposed along the bottom or hinged edge of the hinge or tilt-up display 112. Display 112 incorporates a liquid crystal display panel 116 and light distributor 118 to uniformly distribute light from the light bulbs 114 to liquid crystal display panel 116.

Liquid crystal display panel 116 is a conventional light transmissive back-lit liquid crystal display panel as found in many laptop and portable computers.

A light transmitter/light distributor 118, sometimes referred to in the art as a "light pipe," is preferably disposed with one of its faces, the front or exit surface 120, adjacent to the back face 122 of the liquid crystal display panel 116.

The light distributor 118 is illustrated in greater detail in FIGS. 3, 3A and 3B. Opposite the exit surface 120 is rear surface 124 of light distributor 118. The rear surface 124 forms the exterior surface of the back of the display unit 112 of computer 110. The diffusion surface, rear surface 124, is formed with minute light diffusing patterns as is known in the art of light pipes to diffuse light striking rear surface 124 from within the light distributor. The rear surface characteristic of the light distributor 118 causes light striking the back or exterior surface 124 of the light distributor 118 to be diffused internally within the light distributor 118 such that it will be redirected to and through the front or exit face 120 thereof and through the liquid crystal display panel 116. The light distributor 118 is formed such that the light which emanates from the light bulb or light source 114 is collected into the light distributor 118 and is ultimately reflected from its back surface 124 to the front or exit surface 120. Those light rays which strike the exit surface 120 at an angle of substantial perpendicularity or at least at an angle of incidence at which the rays can pass through the exit face 120 with minimal reflection, thereby achieving maximum light transmittal to the liquid crystal display panel 116.

The illumination distributor 118 is preferably formed to have a planar surface which forms the exit face 120 and a rear surface 124 oriented to converge with the exit face 120. The exit face 120 and the rear surface 124 may terminate prior to complete convergence, forming a trapazoidal cross-sectional or wedge shape for the illumination distributor 118. The surfaces extending between the exit face 120 and the rear surface 124 form the other two sides of the trapazoidal cross-sectional shape of the illumination distributor. The larger of the two sides lie in the wider of the two surfaces extending between the exit face 120 and the rear surface 124, forming the base of the trapazoidal shaped illumination distributor.

The base of the illumination distributor is preferably utilized to introduce illumination into the illumination distributor 118 by locating an illumination source 114 adjacent thereto.

Light striking the exit surface 120 of the light distributor 118 at a high angle of incidence approaching perpendicularity will not be reflected internally but will pass through the exit surface 120 and subsequently pass through the liquid crystal display panel 116 if the crystals in the display panel 116 are in a state to pass the light through the liquid crystal display panel 116. Light rays that have been diffused to the exit face 120 at an angle of incidence too small to allow the rays to exit the illumination distributor 118 are internally reflected and will continue to reflect internally until the rays again strike the rear surface 124 and again are diffused to the exit face 120. The diffusion and internal reflection continues until each light ray strikes the exit fac[0085] 120 at an angle of incidence at which the ray exits the illumination distributor 118. The minimum angle of incidence at which the light ray may exit the illumination distributor 118 is determined by the reflective qualities of the particular material selected for the illumination distributor 118.

Light rays 140 thus are reflected through the front or exit face 120 of the light distributor 118. However, light rays 142 or 144 which may not strike a diffusing surface on face 124 such that the rear surface redirects light rays 142, 144 to the exit face 120 at an angle of incidence great enough to permit the exiting of ray 142, 144 are instead reflected toward the exit face 120 and strike the exit face surface 120 at an angle of incidence well smaller than the angle of incidence at which the light ray may exit the light distributor 118. When the angle of incidence is small enough that the light ray cannot exit through the exit face 120 due to the internal reflective qualities of the light distributor 116, light rays 142, 144 reflect internally within the light distributor 118 until the light ray 142, 144 strikes exit surface 120 at an angle of incidence at which light rays 142, 144 may exit and pass through the liquid crystal display panel 116. When light rays 142, 144 strike rear surface 124 at such an angle that they exit rear surface 124, they are reflected from reflective layer 154 back into the light distributor 118 and again reflected internally until the ray 142, 144 strikes the exit face 120 at an angle of incidence such that the ray 142, 144 exits the light distributor 118 and passes to and through liquid crystal display panel 116.

Reflective coating 154 may be a vapor-deposited layer of a highly reflective metal, such as aluminum, nickel or silver, or a highly reflective paint layer. Reflective layer 154 will reflect any light rays that escape from the light distributor 118 through the rear surface 124 of light distributor 118, thus containing and using all the light from the light source 114 to back-light the liquid crystal display panel 116.

In order to provide an exterior surface suitable to withstand impacts, scratches and other normal day-to-day handling use and abuse, a protective coating 156 is applied to the exposed side of the reflective coating 154. This protective coating 156 preferably would be a paint with extremely durable characteristics such as found in an epoxy paint.

Referring now to FIGS. 4 and 5, a tilt-up display 112 for a laptop computer 110 is illustrated separate from a computer.

In FIG. 4 illumination sources or light bulbs 114 are disposed at each end of the display 112, and the liquid crystal display panel 116 is backed by a pair of illumination distributors 182. Illumination distributors 182 each converge to a narrow edge 170; narrow edges 170 are joined to form a single seamless illumination distribution unit 178. Preferably, the joining of the separate illumination distributors is done in a manner whereby the ability of light to transit across the narrow edge boundary joint 172 in an unaltered path is maintained, preventing light absorption and loss.

Alternatively, single seamless illumination distribution unit 178 may be fabricated as a unitary member, thereby increasing its strength and illumination qualities. The illumination distributor 178 is coated with a previously described reflective material to enhance the full use of all light introduced into the illumination distributor 178 and to prevent light loss. If additional strength is desired, a pentahedral reinforcing member 180 fitting the contour of the illumination distributor 178 may be adhesively attached to the rear surface 190 of the illumination distributor 178. Following this, the exposed surfaces the illumination distributor 178 and exposed surfaces 184 and 186 of pentahedral member 180 may be coated with protective coating 188, such as an epoxy paint, to provide wear resistance and protection for elements of the display assembly 112.

FIG. 5 illustrates a top view of the display assembly 112 and further shows the pentahedral member 180 disposed juxtaposed to the rear surfaces 190 of the illumination distributor 178, as well as the illumination sources 114 and reflectors 115 adjacent the end edges 179 of the illumination distributor 178.

With reference to FIGS. 2, 3, 3A, 4 and 5, the display bezel 200 in both embodiments illustrated may be a plastic molding which frames the liquid crystal display panel 116 and encloses the edges of the illumination distributor 118, 178, light source or sources 114, and the reflector or reflectors 115 associated with the light sources 114.

If it is intended for the liquid crystal display assembly 112 to be only replaceable and not field serviceable, then adhesives may be used not only to assemble the elements of the display 112 including the illumination distributor 178, illumination sources 114, reflectors 115 and bezel 200, but also to retain the entire assembly in its assembled condition. An epoxy adhesive would provide retention functions while at the same time creating and maintaining a highly rigid structure.

Due to the fact that the liquid crystal display panel 116 is a conventional and well known structure and operation and is readily available from commercial sources to one of skill in the art of displays, it is not necessary to describe the liquid crystal display panel structure or operation in detail. Similarly, the electronic control of the liquid crystal display need not be described herein because it also is well known to those skilled in the art of liquid crystal displays.

The illumination distributor 118, 178 may be fabricated from a transparent acrylic plastic or similar materials such as LEXAN® or other similar materials having a good light transmissive characteristic. Smooth surfaces of LEXAN and similar light transmissive materials will internally reflect light striking a surface thereof at a shallow or small angle of incidence while not reflecting light rays striking the surface internally or externally at a high angle of incidence , i.e., approaching 90°.

By forming the external surface of the back of the liquid crystal display assembly with a hard shock and abrasion resistant coating of epoxy paint or similar material, costs and the weight of the liquid crystal display assembly should noticeably be reduced. Assembly and manufacturing will be similarly simplified.

The precise shape and reflective characteristics of the illumination distribution member 118, 178 may be designed using the principles of light pipe design which are well known to those of skill in the art of light pipe design.

The light rays 142, 144 emanating from the light sources 114 and reflectors 115 are transformed by reflection at the rear surface 124, 170 of illumination distributors 118, 178, respectively, from radiating rays to substantially parallel rays that impinge upon the exit face 120 of illumination distributors 118. Due to the high angle of incidence with the exit face 120, light rays 142, 144 are not reflected back into the illumination distributor 118, 178 but exit the front face 120 of the illumination distributor 118, 178 and pass through the liquid crystal display panel 116.

As can be seen from the foregoing explanation, the illumination distributors 118, 178 may be manufactured in a configuration that allows the insertion of a liquid crystal display panel 116 into the illumination distributor 118, 178, along with illumination sources 114 and reflectors 115. If the illumination distributors 118, 178 are configured in a proper shape, the need for a bezel 200 may be obviated and the non-optical portions of the illumination distributors 118, 178 become the entire housing for liquid crystal display assembly 112, and provide the external surfaces of the tilt-up display 112.

It should be understood that the description above is for the purpose of enabling one of skill in the art to practice the invention described. The choice of specific materials is left to the individual practicing the invention so long as the materials chosen have the properties described. Any person of ordinary skill in the art will recognize that minor alterations and changes may be made in the apparatus described above without departing from the scope of the claims that follow. It is the inventor's intention that the description of the invention not limit the scope of the protection for the invention and the scope of protection only be defined by the following claims.

What is claimed is:

1. A computer display comprising:

a liquid crystal display panel;

an illumination distributor for spreading illumination over said liquid crystal display panel, said illumination distributor substantially co-extensive with said liquid crystal display panel;

an illumination source disposed along one edge of said illumination distributor;

said illumination source partially surrounded by a reflector for directing illumination from said illumination source to said illumination distributor;

said illumination distributor comprising a first surface juxtaposed with said liquid crystal display panel and a second surface having a diffusing surface disposed to converge with said first surface substantially at one edge of the said liquid crystal display;

said diffusing surface coated with a reflective material and said reflective material further coated with a protective coating, said protective coating forming an external surface of said computer display, said computer display is attached to a computer housing and said illumination source is disposed proximate to said computer housing.

2. The computer display of claim 1 wherein said illumination source is disposed spaced apart from said computer housing.

3. The computer display of claim 2 wherein said illumination distributor is wedge-shaped having a base, and said illumination source and reflector are disposed adjacent and substantially parallel to said base.

4. The computer display of claim 3 wherein said planar and said diffusing surface converge at an angle such that light entering said base of said illumination distributor reflects from said diffusing surface onto said first surface at an angle whereby substantially all of said reflected light passes through said planar surface to said liquid crystal display.

5. The computer display of claim 1 wherein said illumination distributor is comprised of a pair of light transmissive bodies, and said illumination source disposed parallel and adjacent to a surface of each trapezoidal shape forming a base of said trapezoidal shape.

6. The computer display of claim 5 wherein said pair of light transmissive bodies are joined together, each said light transmissive body having a trapezoidal cross-section and disposed adjacent to a second one of said pair of light transmissive bodies at the narrowest face of said trapezoidal cross-section.

7. A computer display comprising:

a liquid crystal display panel;

an illumination distributor for spreading illumination over said liquid crystal display panel, said illumination distributor substantially co-extensive with said liquid crystal display panel;

an illumination source disposed along one edge of said illumination distributor;

said illumination source partially surrounded by a reflector for directing illumination from said illumination source to said illumination distributor;

said illumination distributor comprising a first surface juxtaposed with said liquid crystal display panel and a second surface having a diffusing surface disposed to converge with said first surface substantially at one edge of the said liquid crystal display;

said diffusing surface coated with a reflective material and said reflective material further coated with a protective coating, said protective coating forming an external surface of said computer display, said computer display further comprising a housing enclosing end surfaces of said illumination distributor, edges of said liquid crystal display panel, said illumination source, and exposing said protective coating extending across said reflectively coated diffusing surface of said illumination distributor, whereby said coated illumination distributor of said computer display forms said exterior surface of said display and an exterior surface of a computer assembly of which said display is a part.

8. A computer display and illumination system therefore comprising:

a liquid crystal display panel having at least one planar surface;

an illumination source disposed proximate one edge of said liquid crystal display panel;

an illumination distribution member disposed with one planar surface thereof parallel and adjacent to said planar surface of said liquid crystal display panel;

said illumination distribution member having a trapezoidal cross-sectional shape and further having a planar first side, a second side, a third side, a pair of trapezoidal shaped edge surfaces orthogonal to said first planar side and said third side, said second side coated with a reflective material and said reflective material further coated with a non-light transmissive material, wherein said non-light transmissive protective coating forms an exterior surface of said computer display.

9. The computer display and illumination system of claim 8 wherein said illumination distribution member comprises a plurality of reflecting surfaces formed into said second side and disposed to direct light from said illumination source to and through said first side and through said liquid crystal display panel.

10. The computer display and illumination system of claim 8 wherein said illumination source comprises an elongated light bulb disposed within a reflector and disposed adjacent said edge of said illumination distribution member.

11. The computer display and illumination system of claim 8 wherein said computer display and illumination system comprises a pair of illumination sources and said illumination distribution member comprises a pair of truncated triangular-shaped cross-sectioned light transmissive members joined at the truncated apexes thereof with a first side of said illumination distribution member forming a planar surface.

12. The computer display and illumination system of claim 11 further comprising a plurality of reflecting surfaces formed into a second side of said illumination distribution member disposed to redirect light impinging on said reflecting surfaces to and through said liquid crystal display.

13. The computer display and illumination system of claim 12 wherein said illumination sources are disposed adjacent opposing edges of said illumination distribution member.

14. The computer display and illumination system of claim 11 further comprising a bezel circumscribing said liquid crystal display panel and said illumination source and exposing said protective coating on said second side of said illumination distribution member.

* * * * *